June 28, 1960   B. J. MILLEVILLE   2,942,495
VALVE OPERATING MECHANISM
Filed April 9, 1957   2 Sheets-Sheet 2
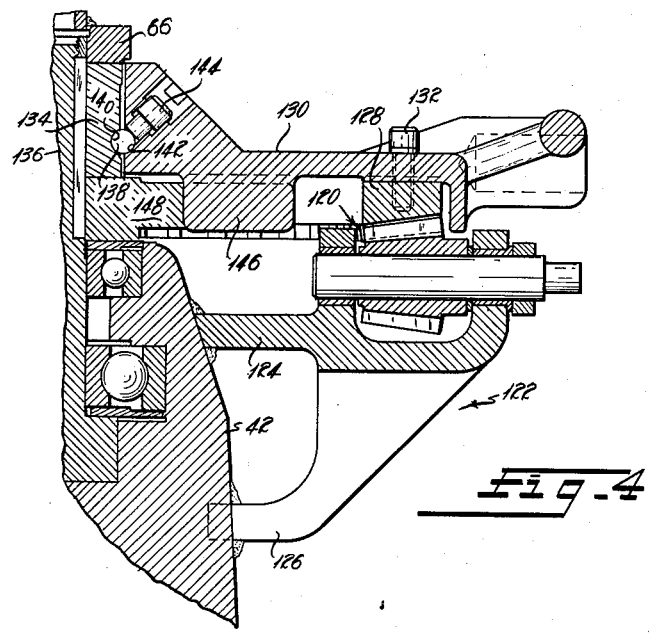
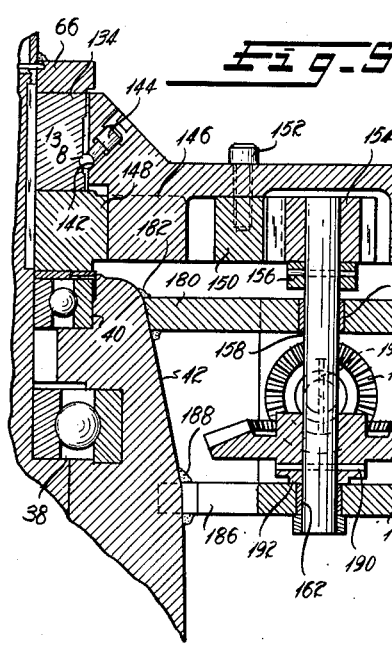
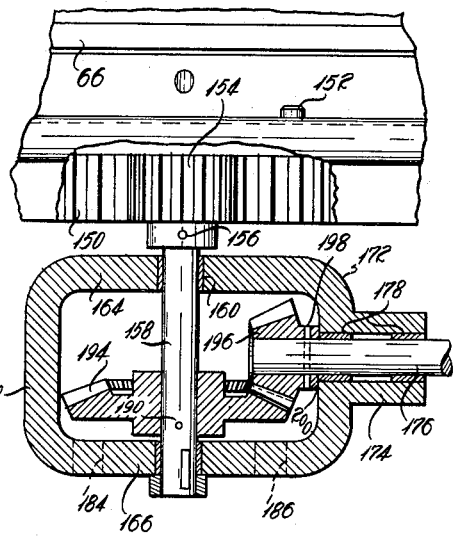
INVENTOR
BERTRAM J. MILLEVILLE
BY
ATTORNEYS

United States Patent Office 2,942,495
Patented June 28, 1960

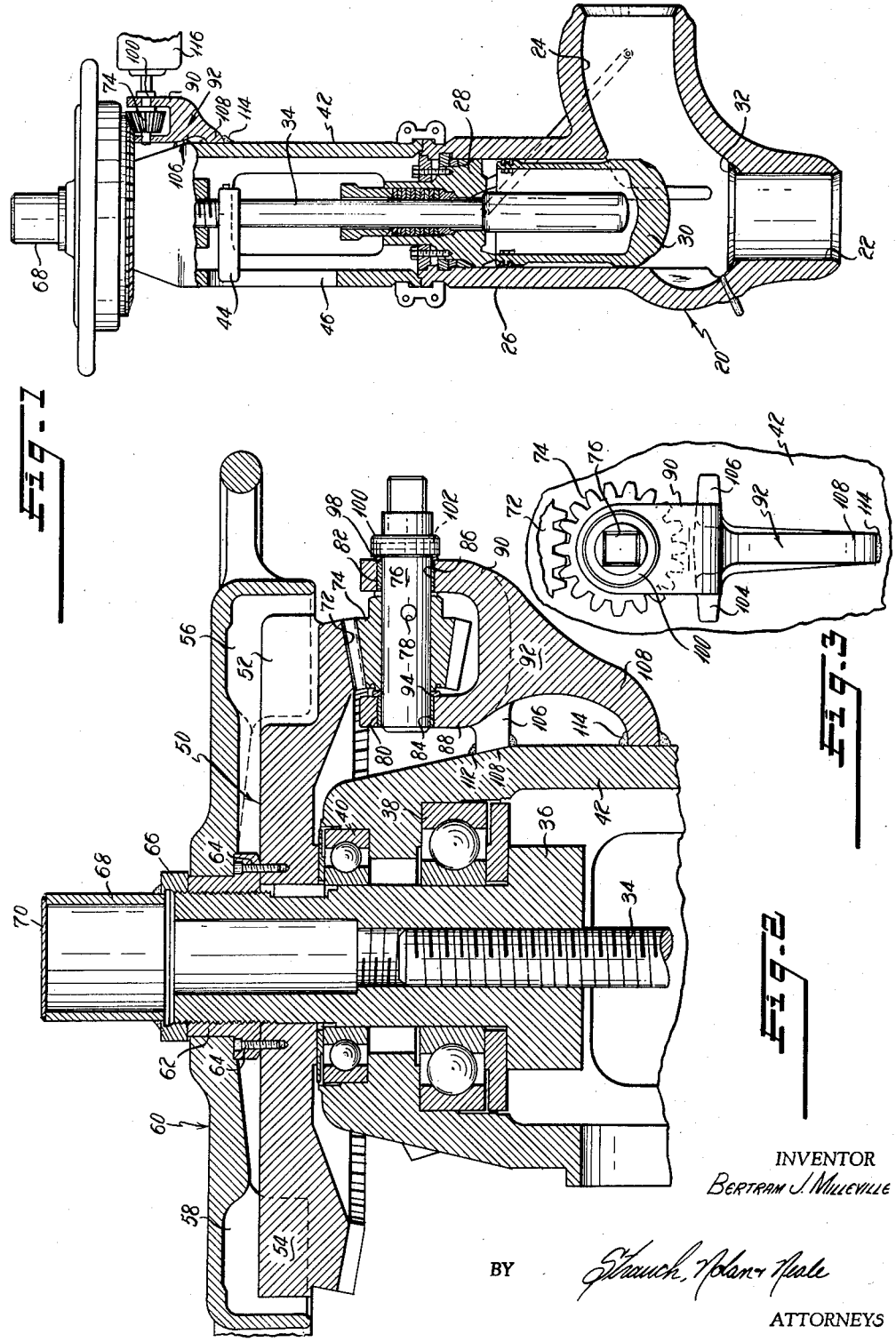

2,942,495

VALVE OPERATING MECHANISM

Bertram J. Milleville, Homewood, Ill., assignor to Edward Valves, Inc., East Chicago, Ind., a corporation of Delaware Filed Apr. 9, 1957, Ser. No. 651,732

6 Claims. (Cl. 74—625)

This invention relates to valve constructions and more particularly to apparatus for moving the closure elements of valves used in high pressure, high temperature service between open and closed positions.

For present purposes the invention will be disclosed as applied to a valve of the type shown in United States Patent No. 2,665,874. Valves of this type are used to control the flow of fluids at pressures up to 3000 p.s.i. and higher and are provided in a range of sizes, the larger sizes having a closure element fourteen inches or more in diameter and a stem four inches or more in diameter. The travel of the valve closure element between open and closed positions may be 14 inches or more. Valves of this type are usually opened and closed by rotation of a threaded stem bushing operated by a handwheel. While the valve closure elements may be moved toward and away from a position close to the final seated position with a substantially constant relatively high torque, a substantially higher torque is required to move the valve toward or away from its fully closed finally seated position.

Generally the torque required to move the valve closure element throughout the major portion of its travel can be developed by one or two men. However, the manual opening and closing of the valve is a time-consuming process and in the case of larger valves could require an hour or more of the time of two or three men. Generally in order to provide the extreme torque required for final closing or initial opening of the valve an impact imparting handwheel assembly is used as shown in the aforementioned patent.

In view of the time-consuming and laborious nature of the work involved in opening and closing such valves many expedients such as gear drives or electric, hydraulic or pneumatic motors have been proposed to facilitate the performance of this operation. However, none of these expedients has proved entirely satisfactory. In the case of gear drives and other mechanical expedients employed to increase the mechanical advantage of the system, the time required to move the valve between open and closed positions is usually increased to an unreasonable value. While various motor operators have provide to be satisfactory in service nevertheless they require expensive maintenance and may increase the cost of a large high pressure gate or globe valve as much as 50%.

The most effective prior solution to this problem is disclosed in copending application Serial No. 533,933. In the system disclosed and claimed therein a relatively small motor is permanently installed on the valve and connected through a gear drive to the cross arm assembly of the impact developing handwheel assembly. To minimize the expense of such an installation the motor is capable of developing only that torque which is required to move the valve to a position close to its final seating position or to move the valve in opening direction after the valve is unseated. The final seating movements of the closure as well as the initial unseating movements are effected through a joint operation of the motor drive and the impact developing handwheel. This system represents a substantial improvement over preceding systems and has met with favorable acceptance in the field. However, the cost of such an installation may add as much as $2000.00 to the cost of the valve. This cost is warranted in many cases where the valves are frequently operated. However, in many installations the setting of the valve remains unchanged for weeks or months at a time. In such cases the time-consuming and laborious manual operation of the valve, despite its many disadvantages, is preferable to the installation of the relatively expensive permanent motor drive assembly.

It is accordingly the principal purpose and object of the present invention to provide improved simplified and relatively inexpensive valve operating mechanisms including a geared motor driven assembly.

This primary object is achieved by the provision in the preferred form of the invention of a valve operator assembly comprising a crossarm connected to the threaded stem operator, an impact developing handwheel adapted to impart heavy blows to said crossarm assembly to effect the final seating or initial unseating of the valve and a novel gear train connected to the crossarm or to the handwheel, the gear train terminating in a shaft adapted to receive the output shaft of a portable drive motor. Preferably the portable drive motor is from ⅕ to ⅒ the size required for motors as conventionally used and does not develop sufficient torque to finally seat the valve or to initially unseat it. Both the final seating of the valve and the initial unseating are effected through use of the impact developing handwheel.

Accordingly, it is a further important object of the present invention to provide novel valve operating mechanisms which provide for easy and rapid operation of the valves at a fraction of the cost of prior comparable systems.

It is a further object of the present invention to provide novel valve operator assemblies which may be incorporated in valves of standard construction such as those shown in the aforementioned Patent 2,665,874 with little or no modification and which thus may be readily installed on valves now in service in the field as well as new valves.

It is also an object of the present invention to provide improved valve operator assemblies which comprise a minimum number of structurally rugged, relatively inexpensive parts and which may be expected to provide a relatively long maintenance-free service life.

Additional objects and advantages will become apparent as the description proceeds in connection with the accompanying drawings in which:

Figure 1 is an elevation partly in section of a valve incorporating one embodiment of the operator assembly of the present invention;

Figure 2 is an enlarged fragmentary central section of the valve of Figure 1;

Figure 3 is a fragmentary side elevation of the apparatus of Figure 2;

Figure 4 is a fragmentary central section of a modified construction;

Figure 5 is a view similar to Figure 4 showing a further modification; and

Figure 6 is a fragmentary elevation of the apparatus of Figure 5.

Referring now more particularly to the form of the invention shown in Figures 1–3 of the drawings, the valve shown in Figure 1 is generally of the type disclosed in the aforementioned U.S. Patent No. 2,665,874 and is of the angle non-return type. However, it is to be understood that the invention may also be applied to valves of other types including stop valves, gate valves, and other forms of globe valves.

The valve assembly shown in Figure 1 comprises generally a body 20 having inlet and outlet passages 22 and 24, respectively, and a tubular extension 26 in which a bonnet 28 is received. The valve closure member 30 is slidably received in the tubular extension 26 and cooperates with a seat 32 to control the passage of fluids through the valve. The closure member 30 may be moved toward the seat by gravity or by fluid flowing through the valve or may be positively moved toward closed position by a stem 34 threaded at its upper end into a yoke bushing 36 rotatably mounted by suitable thrust bearing assemblies 38 and 40 supported in a conventional manner on the yoke 42. Rotation of the bushing 36 in the bearing assemblies 38 and 40 produces axial movement of the stem which is held against rotary movement by a guide arm 44 non-rotatably secured to the stem and extending through an opening 46 in the yoke 42.

A crossarm assembly 50 is keyed to the yoke bushing 36 above the bearing 40 and is provided with radially extending abutments 52 and 54 interposed in the path of lugs 56 and 58 formed on a handwheel assembly 60 rotatably mounted on an adapter 62 threaded on to the upper portion of the yoke bushing 36 and secured by screws 64 to the crossarm assembly 50. A cap assembly comprising a ring 66 threaded on to the upper end of the bushing 36, a tubular extension 68 and a top cover member 70 is provided to close the upper end of the bore in the yoke bushing 36.

After the abutments 52 and 54 are contacted by the lugs 56 and 58, a steady pull on the handwheel will cause the handwheel, the crossarm assembly and the yoke bushing to rotate together to move the stem axially to thereby move the valve toward open or closed position depending upon the direction of rotation of the handwheel. The relatively high torque necessary to seat or unseat the valve may be obtained by backing the handwheel off and rotating it rapidly through a portion of a revolution so that the lugs 56 and 58 strike the abutments 52 and 54 with a heavy impact. Usually a number of such impact blows are necessary to accomplish the desired result.

While the structure thus far described, which is essentially the same in operation as that shown in the aforesaid U.S. Patent No. 2,665,874, may be used to operate the valve through its full travel this manual operation is laborious and time-consuming and since the process may take over an hour it is ineffective under emergency conditions.

In accordance with the present invention an auxiliary drive mechanism is combined with the prior structure in a novel manner to operate the valve over the major portion of its travel.

The auxiliary drive mechanism shown in Figures 1–3 includes a bevel gear 72 formed on the under surface of the crossarm assembly 50. Preferably the gear 72 is formed integrally as shown although if desired the gear may be formed separately and secured by any suitable means to the standard crossarm assembly shown in the aforementioned Patent No. 2,665,874. A drive pinion 74 meshing with the bevel gear 72 is non-rotatably secured to a shaft 76 by a pin 78. The shaft 76 is supported for rotation in bearings 80 and 82 inboard and outboard of the pinion 74, the bearings being mounted in respective bores 84 and 86 provided in upwardly extending arms 88 and 90, respectively, formed integrally with a mounting bracket 92. Thrust washers 94 and 96 are positioned between the ends of the hub of the pinion 74 and the adjacent surfaces of the respective arms 88 and 90. An additional thrust washer 98 is mounted between the outer surface of the arm 90 and the inner surface of a collar 100 non-rotatably secured to the shaft 76 by a pin 102.

The mounting bracket 92 is provided with integral upper mounting arms 104 and 106, and a lower mounting arm 108 each of which terminates in arcuate surfaces which conform to the curvature of the outer surface of the yoke 42. The arms 104 and 106 and the arm 108 are welded as at 112 and 114 to the yoke to form a structurally rugged, permanent installation. The spacing of the mounting arms 104, 106 and 108 together with the width of their end surfaces which are secured to the yoke 42 and the inboard and outboard mounting of the shaft 76 contribute to a rigid, strong, compact and relatively light-weight support for the drive pinion 74. It will be noted that the entire auxiliary assembly is mounted under the handwheel 60 so the overall size of the valve is not increased by the installation of the auxiliary drive assembly of the present invention. As shown in Figure 3, the outer end of the shaft 76 may be squared to adapt it to be driven by the output shaft of a conventional portable motor assembly indicated generally at 116. It will be understood that other conventional constructions may be employed on the outer end of the shaft such as splines or a groove and key construction to provide a drive connection between the motor and the shaft 76.

Several types of relatively small reversible motors or motor drive units may be employed to drive the shaft 76. In accordance with the present invention, a relatively small motor, for example, ¾ horsepower, is employed for this purpose. If desired, a standard portable air powered drill may be used. In all cases the driver will be relatively small since it is not intended to be used to fully seat or unseat the valve closure. These latter operations are effected by operation of the impact developing handwheel in the normal manner, assisted, if desired, by the application of a continuous torque through the shaft 76. This latter operation is made possible in the form of the invention shown in Figures 1–3 by the fact that the auxiliary drive system is incorporated in the valve operating train without altering the normal operation of the impact developing handwheel. In practice, the auxiliary drive will be used to effect approximately 90% to 99% of the movement of the valve stem, the remainder to be produced by operation of the impacting handwheel.

In a typical case, assuming the valve to be fully opened, the portable driver is connected to the shaft 76 and rotated in the proper direction to produce closing movement of the valve. In most cases, the closing movement will be continued until the closure member contacts the seat at which time the resistance to stem travel will exceed the torque applied by the portable driver and will cause the latter to stall. Final seating of the valve may then be effected by operation of the handwheel. If the valve is fully seated, it will be initially started toward the open position by suitable operation of the handwheel. As soon as the closure member is free of the seat, the torque developed by the portable driver will be sufficient to move the valve to any desired open position. By the utilization of the novel apparatus of the present invention and because of its unique co-action with the conventional impacting handwheel, the time and effort necessary to operate the valve under any condition will be substantially reduced at a much lower cost than that attendant with prior motor operated valves.

The relation between the speed of rotation of the shaft 76 and the bushing 36 will depend upon the respective pitch diameters of the gears 72 and 74 which can be varied within reasonable limits as desired. In a typical case, the gear 72 is a 4 pitch twenty-seven inch pitch diameter gear and the pinion 74 is a 4 pitch 3 inch pitch diameter gear. This relationship has been found satisfactory for many applications and facilitates formation of a gear 72 as an integral part of the crossarm assembly 50.

A modified form of the invention is illustrated in Figure 4 to which detailed reference will now be made.

In this form of the invention the ring gear which is driven by the auxiliary power source is secured directly to the handwheel rather than to the crossarm of the impact developing handwheel assembly. The construction and mounting of the pinion assembly indicated generally at 120 is preferably identical with the construction described above in connection with Figures 1 through 3. The pinion mounting bracket indicated generally at 122 is also generally of the same construction as the corresponding bracket 92 described above except that the upper and lower bracket mounting arms 124 and 126, respectively, are of slightly modified configuration to permit the mounting of the assembly at a relatively elevated position on the valve yoke 42.

The ring gear 128 is secured directly to the undersurface of the modified handwheel 130 by a plurality of bolts 132. The handwheel 130 is mounted on a modified adapter 134 which is keyed to the slightly modified stem bushing 136. The handwheel is preferably supported for rotation on the adapter 134 by a plurality of ball bearings 138 received in race 140 in the adapter and in a mating race formed in the handwheel. The balls are inserted through hole 142 closed by plug 144. The handwheel 130 is provided with a pair of downwardly projecting lugs 146 (one shown) adapted to engage the outer ends of a modified crossarm assembly 148 which is keyed to the stem bushing 136.

As in the previously described embodiment the auxiliary gear operator is used primarily to move the valve in a closing direction to a position just short of final seating or to move the valve in an opening direction after it has been unseated. Both final seating and initial unseating are effected by the impact developing handwheel assembly. The direct connection between the handwheel and the gear train modifies the action of the assembly during impacting in either direction. In the unit of Figure 4 the operator in accelerating the handwheel must also accelerate the gear train. When the lugs 146 on the handwheel contact the ends of the crossarm assembly, the gear train, as well as the handwheel, is rapidly decelerated. Taking into account the gear ratios and the inertia of all rotating parts the additional moment of inertia added by the gear train is equivalent to about 13% of that of the handwheel alone.

Experience has shown that in certain cases it is desirable to provide a higher gear ratio in the auxiliary operator than is conveniently obtainable with the bevel and ring gear construction of the embodiments of the invention discussed above. Figures 5 and 6, to which detailed reference will now be made, disclose a further embodiment of the invention including additional gears which raise the total gear ratio of auxiliary drive train to the order 15:1. As in the embodiment of Figure 4 the torque developed by the auxiliary gear train is applied directly to the handwheel rather than to the crossarm assembly.

The modified construction of Figures 5 and 6 includes a ring gear 150 attached by bolts 152 to the underside of the handwheel. The mounting and construction of the handwheel and crossarm assembly in the apparatus of Figures 5 and 6 is preferably substantially identical to that of the corresponding components in the embodiment of Figure 4. The ring gear 150 meshes with a pinion 154 secured by a pin 156 to the upper end of a headed shaft 158 rotatably mounted in bushings 160 and 162 provided in the upper and lower arms 164 and 166, respectively, of the mounting bracket assembly indicated generally at 168. The upper and lower bracket arms 164 and 166 are integrally joined at one side by a vertical arm 170 and at the opposite side by a vertical arm 172 the latter including a mounting boss 174 in which a shaft 176 is rotatably supported on bushings 178. Projecting laterally from the central portion of the upper arm 164 is a mounting bracket 180 terminating at its free end in an arcuate surface welded as at 182 to the yoke 42. The lower arm 166 is provided with a pair of spaced laterally projecting arms 184 and 186 each terminating at their inner ends in arcuate surfaces welded as at 188 to the yoke 42.

Non-rotatably secured to the shaft 158 by a pin 190 above a thrust washer 192 is a gear 194 which meshes with a pinion 196 secured by a pin 198 to the inner end of shaft 176. A thrust washer 200 is provided between the adjacent surfaces of the arm 172 and the pinion 196. The outer end of the shaft 176 is provided with a suitable squared, splined or similar formation for receiving an auxiliary drive motor. It will be noted that the axis of the drive shaft 176 is rotated 90 degrees from the position of the corresponding shaft in the previously described embodiments to reduce the overall size of the mechanism and to assure that all parts of the auxiliary drive mechanism will be mounted within the periphery of the handwheel. If desired the gear train may be partially enclosed by a protective sheet metal cover plate 202. Alternately the entire gear train may be enclosed in a conventional cast housing.

The operation of the apparatus of Figures 5 and 6 is essentially the same as that of the embodiment of Figure 4. In a typical case the apparatus of Figures 5 and 6 provides a total gear ratio of 17.5:1. This is achieved through the use of a pinion 196 having a pitch diameter of three inches, a gear 194 having a pitch diameter of 7.5 inches, a pinion 154 having a pitch diameter of 3 inches and a ring gear 150 having a pitch diameter of 21 inches.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An operator for a valve having a stem threaded into a bushing rotatably mounted in a yoke and fixed against axial movement therein whereby rotation of said bushing moves said stem axially comprising a crossarm assembly rotatable with said bushing and having radial abutments, a handwheel mounted for free rotation about the axis of said stem and having surfaces adapted to engage said abutments after limited rotation of said handwheel, a bevel gear rigid with said crossarm assembly and extending downwardly therefrom, a bracket assembly secured to said yoke beneath said handwheel, a shaft mounted for rotation in inner and outer bearings on said bracket assembly, said shaft extending radially of said valve and projecting outwardly of said outer bearing, a pinion non-rotatably secured to said shaft between said bearings and meshing with said bevel gear, and means on the projecting end of said shaft adapted to be drivingly connected to a portable motor whereby operation of said motor will rotate said stem bushing and move said stem axially.

2. In a valve having a threaded stem element axially movable by relative rotation of said stem element and a mating threaded element mounted on the valve, drive means for effecting said relative rotation comprising, a member drivingly connected to one of said elements, a handwheel, means providing a lost-motion connection between said handwheel and said member whereby said handwheel may drive said member by impact, a bevel gear rigid with said member, a bracket assembly secured to said yoke beneath said handwheel, a shaft mounted for rotation in inner and outer bearings on said bracket assembly, said shaft extending radially of said valve and projecting outwardly of said outer bearing, a pinion non-rotatably secured to said shaft between said bearings and meshing with said bevel gear, and means on the projecting end of said shaft adapted to be drivingly connected to a portable motor whereby operation of said motor will rotate said member and move said stem element axially.

3. In a valve having a yoke, a threaded bushing rotatably mounted on said yoke and fixed against axial movement with respect thereto and a stem threaded into said bushing and moved axially by rotation of said bushing; means for rotating said bushing comprising, a crossarm assembly non-rotatably secured to said bushing, a ring gear rigid with said crossarm assembly, a handwheel mounted for free rotation on said bushing, said handwheel and said crossarm assembly having cooperating abutment surfaces for limiting the rotation of said handwheel with respect to said crossarm assembly, a bracket assembly secured to said yoke beneath said handwheel, a shaft mounted for rotation in inner and outer bearings on said bracket assembly, said shaft extending radially of said valve and projecting outwardly of said outer bearing, a pinion non-rotatably secured to said shaft between said bearings and meshing with said bevel gear, and means on the projecting end of said shaft adapted to be drivingly connected to a portable motor whereby the torque transmitted by said motor to said bushing through said gears may be selectively augmented by torque applied continuously or by impact by said handwheel.

4. An operator for a valve having a stem threaded into a bushing rotatably mounted in a yoke and fixed against axial movement therein whereby rotation of said bushing moves said stem axially comprising, a crossarm assembly rotatable with said bushing and having radial abutments, a handwheel assembly mounted for free rotation about the axis of said stem and having surfaces adapted to engage said abutments after limited rotation of said handwheel, a bevel gear rigid with one of said assemblies and extending downwardly therefrom, a bracket assembly secured to said yoke beneath said handwheel assembly, a shaft mounted for rotation about an axis substantially normal to the axis of said stem in inner and outer bearings in said bracket assembly, said shaft extending radially of said valve and projecting outwardly of said outer bearing, a bevel pinion non-rotatably secured to said shaft between said bearings and meshing with said bevel gear, and means on the projecting end of said shaft adapted to be drivingly connected to a portable motor whereby operation of said motor will rotate said stem bushing and move said stem axially.

5. In a valve having a threaded stem element axially movable by relative rotation of said stem element and a mating threaded element mounted on the valve, drive means for effecting said relative rotation comprising, a drive member drivingly connected to one of said elements, a handwheel member, means providing a lost-motion connection between said handwheel member and said drive member whereby said handwheel member may drive said drive member by impact, a bevel gear rigid with one of said members, a bracket assembly secured to said yoke beneath said handwheel member, a shaft mounted for rotation about an axis substantially normal to the axis of said stem in inner and outer bearings on said bracket assembly, said shaft extending radially of said valve and projecting outwardly of said outer bearing, a bevel pinion non-rotatably secured to said shaft between said bearings and meshing with said bevel gear, and means on the projecting end of said shaft adapted to be drivingly connected to a portable motor whereby operation of said motor will rotate said drive member and move said stem element axially.

6. The combination according to claim 5 wherein said handwheel member is rotatably mounted on said threaded element by a plurality of ball bearings.

References Cited in the file of this patent

UNITED STATES PATENTS

| | | |
|---|---|---|
| 687,354 | Weber | Nov. 26, 1901 |
| 863,180 | Howard | Aug. 13, 1907 |
| 923,526 | Houser | June 1, 1909 |
| 1,731,314 | Mohr | Oct. 15, 1929 |
| 1,943,854 | Beckwith | Jan. 16, 1934 |
| 2,709,062 | Lamb | May 24, 1955 |
| 2,823,007 | Carr et al. | Feb. 11, 1958 |
| 2,845,814 | Milleville | Aug. 5, 1958 |